Figure 1:
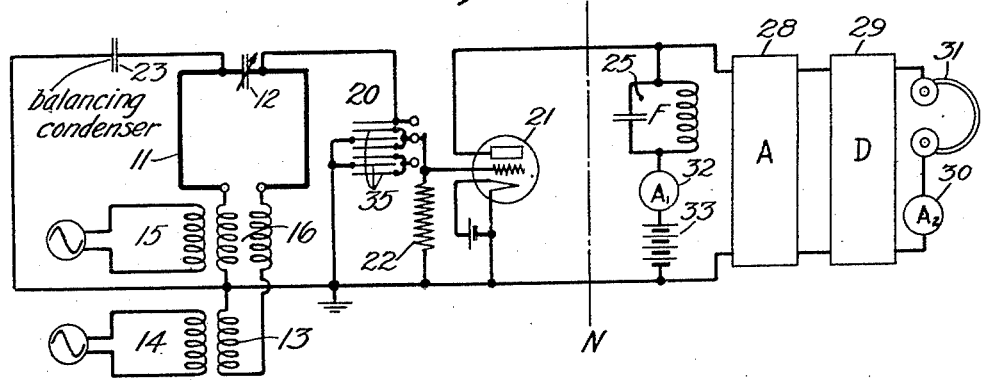

Feb. 24, 1931.  E. BRUCE  1,793,835
ELECTRICAL TESTING
Filed April 26, 1926

Inventor:
Edmond Bruce
by EWGriggs Atty.

Patented Feb. 24, 1931

1,793,835

UNITED STATES PATENT OFFICE

EDMOND BRUCE, OF RED BANK, NEW JERSEY, ASSIGNOR TO BELL TELEPHONE LABORATORIES, INCORPORATED, OF NEW YORK, N. Y., A CORPORATION OF NEW YORK

ELECTRICAL TESTING

Application filed April 26, 1926. Serial No. 104,608.

This invention relates to electrical testing and apparatus capable of use in such testing.

An object of the invention is to quantitatively determine electrical characteristics or conditions of a medium, as, for example, to determine the field intensities produced by electromagnetic waves, or to measure electromotive forces, or the amplification produced by the resonance of a resonant path.

Another object of the invention is to accurately attenuate high frequency waves predetermined amounts, without undue energy dissipation.

As an example of applications of the invention there is described herein the operation of double detection radio receiving systems, embodying specific forms of the invention for measuring rado field strengths, measuring voltages, and for measuring the voltage amplification produced by the resonance of a resonant path.

In these specific forms of the invention an attenuation device is positioned in a network or circuit which is connected to receive signals from a wave receiving antenna. In measuring the wave intensity in a manner described hereinafter, waves other than the incoming signal waves are supplied to the antenna circuit from a local comparison oscillator, and after being attenuated by the attenuating device, are compared with the signals. By making the attenuation large the permissible amplitude of the comparison waves before attenuation can be sufficiently great to be readily measurable accurately, for example by an ordinary vacuum tube voltmeter, and also sufficiently great to render relatively negligible any stray energy received by the antenna. By virtue of the position of the attenuating device in the system not only the comparison voltage but also the stray energy is attenuated.

In employing specific forms of the invention shown in the drawing to measure the voltage amplification produced in the resonant antenna circuit due to its resonance, a voltage, induced in a coil coupled to the comparison oscillator, is introduced in series in the resonant circuit, amplified by the resonance, and the amplified voltage caused to produce an indication of its value. The amplification ratio, which it is desired to know, is the ratio of this amplified value to the value of the induced voltage. By obtaining an indication of the latter therefore, and comparing it with the indication of the former, the amplification ratio may be readily determined. This method is disclosed and claimed broadly in an application of Harald T. Friis, Serial No. 104,619, filed of even date herewith, entitled "Electric wave translating systems." In accordance with the present invention the indication of the induced voltage is obtained by applying the terminal voltage of the coil to the indicating device under such conditions that substantially no current flows in the coil and hence no current impedance drop occurs in the coil. Thus the terminal voltage represents the true voltage induced in the coil. These conditions are attained, in accordance with the invention, by connecting the coil in series with a parallel resonant or anti-resonant circuit, formed by the elements of the antenna circuit and the input circuit of the indicating device. The high impedance of the anti-resonant circuit prevents current flow in the coil.

In a specific form of the invention shown in the drawing there is provided a balanced system for connecting a beating oscillator to a wave receiving loop, to which a detector and a comparison oscillator are connected. This balance of the loop, with respect to the beating oscillator, renders the load on the oscillator independent of loop tuning and thereby avoids undesired change in the energy supplied from the oscillator to the detector. This balanced system is disclosed and claimed in applicant's Patent No. 1,710,254, issued April 23, 1929.

A further feature of the invention is a voltage attenuator formed of capacities between conducting plates so arranged and interconnected as to render the impedance of the requisite interconnecting means or paths as small as possible.

Other objects and features of the invention will be apparent from the following description and claims.

Figure 2:
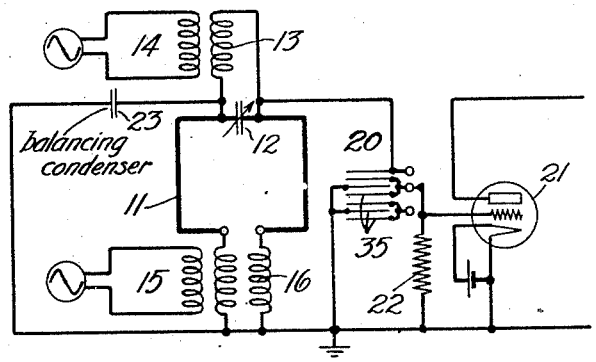
Figure 3:
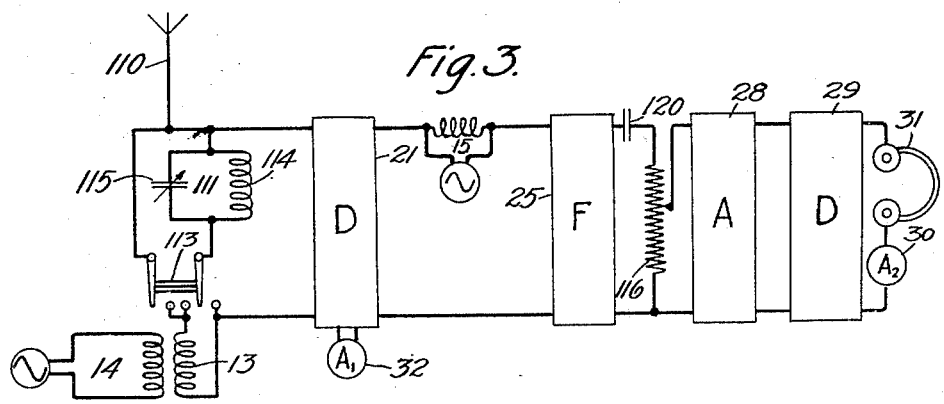

In the accompanying drawings, Figs. 1 and 2 show diagrammatically two circuit arrangements embodying one form of the invention; and Fig. 3 is a circuit diagram of another form of the invention.

In Fig. 1, a loop antenna 11 includes a variable tuning condenser 12. A coil 13, coupled to the output circuit of a local comparison oscillator 14, is connected in series in the loop. The output circuit of a beating or heterodyne oscillator 15 is coupled to the loop by a bifilar coil 16. An adjustable, calibrated, capacitative voltage attenuator 20 has its input terminals connected across a path including, in series, coil 13, the right hand winding of coil 16 and half of the inductance of the loop 11. The output terminals of the attenuator are connected to the input circuit of a detecting device which may be, for example, an electron space discharge detector tube 21.

The input circuit also includes a grid leak resistance 22 having a resistance value of the order of a megohm, connected from the grid to the filament of the tube.

The input impedance of the attenuator, when connected in the circuit as shown, is substantially a capacity, as regards high frequencies, and is balanced by a balancing condenser 23, with regard to the input energy from oscillator 15 to loop 11. The left hand winding and the right hand winding of coil 16 are poled to supply currents upwardly or downwardly simultaneously, with the result that the oscillator 15 produces no potential difference across condenser 12.

An intermediate frequency filter 25, designated F, selects the intermediate frequency wave delivered from the output of detector 21, transmits that frequency to an intermediate frequency amplifier 28, designated A, which delivers amplified waves of the intermediate frequency to a low frequency detector 29, designated D.

The detector 29 detects the intermediate frequency wave to produce low frequency signal currents which are transmitted to indicating means, shown as a direct current microammeter 30, designated $A_2$, and a telephone 31.

A direct current microammeter 32, designated $A_1$, is included in series with a space current source 33 in the D. C. plate circuit of tube 21. The intermediate frequency filter 25, amplifier 28 and detector 29 may be of any suitable types.

The filter F is shown as a parallel resonant circuit, tuned to 300 kilocycles, for example. The amplifier 28 and detector 29 are preferably space discharge tube devices.

The attenuator 20 is a capacity network comprising a series of conducting plates 35 connected to form a plurality of network sections in tandem, each section including a shunt arm formed by capacity and a series arm formed by a capacity. The attenuator utilizes both surfaces of all of its plates, excepting the end plates of the series, so that the impedance of the conductors or paths interconnecting the plates may be as small as possible.

The conductor connecting the grid of tube 21 to the plates of the attenuator is adjustable along the series of attenuation plates, as indicated in the drawing, to connect the grid and filament of tube 21 across any number of the sections of the attenuator network, and thereby set the attenuator for the desired degree of attenuation. Preferably the attenuator is calibrated directly in voltage ratios. Thus, for example, a reading of 10,000 on the attenuator indicates that the voltage impressed on the input terminals of the attenuator is 10,000 times larger than the attenuator output voltage. Maximum attenuation may be, for example, $10^6$ times. The tube 21 and the D. C. microammeter 32 may be calibrated as an ordinary vacuum tube voltmeter.

In Fig. 2 the output circuit (not shown) of tube 21 is the same as shown at the right of line M—N in Fig. 1. Fig. 2 shows coil 13 connected across the condenser 12, instead of directly in series in the loop as in Fig. 1. The purpose of this change will be made apparent hereinafter.

In the system shown in Fig. 3 an antenna circuit including an open antenna 110 and a tuning loop 111 may be connected to the intermediate frequency detector tube 21 of a double detection receiver, through a double throw switch 113. The loop 111 includes an inductance 114 and a variable tuning condenser 115.

The double detection receiver includes in addition to the tube 21 the beating or heterodyne oscillator 15, the intermediate frequency filter 25, an attenuating or gain control device 116, the intermediate frequency amplifier 28, the low frequency detector 29, and the indicating devices 30 and 31.

For use in connection with the receiver when voltage measurements are to be made, as described hereinafter, the oscillator 14 is provided. This oscillator is coupled to the coil 13. When the system is to be used for receiving incoming radio signals, the switch 113 should be closed to the left and the oscillator 14 should be stopped from oscillating, or its circuit should be so arranged that the coil 13, which is inserted in series with the loop 111 by this closure of switch 113, has no electromotive force induced in it from the oscillator circuit.

The circuit arrangement of elements in Fig. 3 is the same as that shown in the application of Harald T. Friis referred to above, and, if desired, the intermediate frequency filter F and the oscillator 15 may, in Fig. 3, be of the type disclosed in that application.

The attenuator 116 may be, for example, resistance units wound with reversed loops on a thin card, and the maximum attenuation may be, for instance, $10^6$ times. The attenuator 116 is preferably calibrated directly in voltage ratios, as explained above in connection with attenuator 20.

The tube 21 and meter 32 are calibrated as an ordinary vacuum tube voltmeter. A large capacity coupling condenser 120 prevents steady potentials from being impressed on the grid of the intermediate frequency amplifier from the filter.

In the operation of the system of Fig. 3, in receiving radio telephone signals transmitted to the antenna 110 as a carrier wave modulated by signal waves of frequencies in the audible frequency range, the modulated carrier wave, received from the antenna circuit and amplified by tube 21, modulates or is modulated by oscillations supplied by the beating oscillator in the plate side, or output circuit, of tube 21.

One of the modulation products, the so-called intermediate frequency, is a signal modulated carrier wave of a frequency equal to the difference between the carrier frequency and the oscillator frequency. This difference frequency will ordinarily be small compared to the carrier frequency received by the antenna. This intermediate frequency in the output circuit of tube 21 passes the intermediate frequency filter F and reaches the attenuator 116, whereas other frequencies are suppressed by the filter F. The intermediate frequency waves, attenuated to the desired extent by the attenuator, are transmitted to the input of the intermediate frequency amplifier A which may be of any suitable type. The amplified waves are transmitted from the output of amplifier A to the input of the low frequency detector 29, which detects the amplified wave to yield the audible frequency signal waves, so that they are audible in the telephone 31, and cause the direct current microammeter 30 to give an indication of the amplitude of the intermediate frequency waves impressed upon the input of detector 29.

To facilitate explanation of the use of the system of Fig. 3 for measuring voltages, it will be assumed, as an example, that the voltage to be measured is the voltage across coil 114 or loop 111 when the set is being used as a receiver. It will be clear from such explanation that other unknown voltages which can be applied across tube 21 and coil 13 may be measured in the manner to be explained with regard to the voltage across loop 111.

To measure the voltage produced by incoming signals across loop 111, which may be designated as an unknown voltage $E_x$, and which may have a frequency $f$ of, for example, forty million cycles per second, switch 113 is closed to the left. The frequency of the beating oscillator 15 may be adjusted to a value $f'$ of say $f \pm 300$ kilocycles. The attenuator 116 is regulated until a convenient deflection appears in meter $A_2$, with the local comparison oscillator 14 delivering no input energy to coil 13. This attenuation may be designated as an attenuation of $a$ times, and the voltage of frequency $f'$ delivered to the output circuit of tube 21 by the oscillator 15 may be designated $E_B$, and the voltage then present across the input of filter 25 may be designated $E_1$. From well known modulation theory, $$E_1 = k E_x E_B$$

where $k$ is a constant depending upon the constants of the system, provided the load on the intermediate frequency detector is not too great. Therefore, designating the attenuator output voltage under these conditions as $E_A$, we can write $$E_A = \frac{K E_x E_B}{a}$$

Suppose we substitute for $E_x$ a voltage $E_o$ from the local comparison oscillator 14 identical in frequency but sufficiently large to be measurable when using the intermediate frequency detector 21 as a tube volt meter when $E_B$ is not applied. With $E_B$ the same value as before, the attenuator is adjusted to $b$ where $A_2$ reads the same as before. Under these conditions $E_A$ must also be the same as previously. Therefore $$E_A = \frac{k E_o E_B}{b}$$

Equating the two expressions given above for $E_A$, gives $$\frac{k E_x E_B}{a} = \frac{k E_o E_B}{b},$$

whence $$E_x = E_o \frac{a}{b},$$

which gives the unknown voltage $E_x$ in terms of $E_o$. Now to determine the value of $E_o$ the beating oscillator is stopped from oscillating, and the voltage $E_o$ is read from the meter $A_1$ which, as stated above, has been calibrated for use with the tube 21 acting as an ordinary vacuum tube voltmeter. The value of $E_o$ being now known, the value of $E_x$, which is desired, is also known, from the last equation above.

As indicated above, the intermediate frequency amplifier A may be of any suitable type, and with $f$ and $f'$ having values as given above, the resonant frequency of the intermediate frequency amplifier should be 300 kilocycles and its band width about 30 kilocycles. This broad band eliminates "hair line" tuning at high signaling frequencies.

The voltage measuring operations described above may be extended to the measurement of a radio field strength, with the system shown in the drawing, by measuring the voltage step up obtained by virtue of the fact that the voltage, say $E_y$ induced in the antenna circuit by the incoming signaling waves produces a higher voltage across the reactance 114, 115 since that reactance is an inductive reactance in series with the capacity of the antenna to ground. When this voltage step up ratio, which may be designated $r$, has been measured; the voltage induced in the antenna circuit by the incoming signaling waves can be found by dividing the above mentioned voltage $E_x$ by $r$. The radio field strength at the antenna can then be calculated by dividing this induced voltage by the effective height of the antenna.

To measure the voltage step up ratio $r$, the beating oscillator is started oscillating again, and the switch 113 is closed to the right to connect the grid and filament of the tube 21 in parallel with the coil 114 and condenser 115 and across coil 13, with local comparison oscillator 14 oscillating. With this condition of the circuit, the setting of the attenuator 116 is changed to give an attenuation which makes the reading of the meter $A_2$ the same as its first or second reading. This attenuation may be designated $c$. The voltage step up ratio $r$ is then given as $$r = \frac{b}{c}.$$

Therefore the voltage induced in the antenna circuit by the incoming signal waves, which may be designated as voltage $E_y$, is $$E_y = \frac{E_x}{r} = \frac{E_o \frac{a}{b}}{r}.$$

In making the last mentioned measurement, switch 113 being closed to the right, the circuit 111, the antenna capacity to earth and the grid to filament capacity of the tube 21 are all in parallel across coil 13 as stated above. With this arrangement the voltage between the grid and filament of tube 21 is substantially the desired true value of the voltage induced in coil 13, since the circuits terminating at the coil 13 constitute a high impedance anti-resonant circuit in series with coil 13.

The method described above for measuring the voltage step up ratio of the antenna circuit is applicable to tuned circuits generally, for measuring step up of voltage accomplished by the circuit due to resonance.

With the voltage attenuator located in the output of the intermediate frequency detector, the attenuator need operate at only the relatively low and fixed intermediate frequency, and therefore great accuracy is possible without elaborate attenuator design, regardless of the signal frequency. Moreover, any interference waves entering the system ahead of the attenuator and supplied to the attenuator are subjected to attenuation therein.

At very high frequencies the measurement of the comparison voltage directly by means of the tube voltmeter, as described above, is more satisfactory as regards accuracy than obtaining the value of this voltage as the product of a current passed through an impedance.

The operation of the receiver of Fig. 1 in measuring voltages, field strengths, and voltage amplification due to resonance, in general is similar to and will be apparent from the description above of the operation of the system of Fig. 3.

To make the measurement of the voltage amplification produced by the resonance of the loop, the coil 13 is connected across the condenser 12, as shown by Fig. 2 instead of in series with the loop; so that the coil 13 is in series with a parallel resonant, or anti-resonant, circuit formed by the loop and the condensers 20 and 23. No change in the amplitude of the oscillations supplied by beating oscillator 15 is made when this change in connections is effected, since there is no potential difference across condenser 12 in respect to the beating oscillator. The impedance of the coil 13 is very small compared with the impedance which it faces. Therefore the voltage impressed on the input to the attenuator 20 by virtue of the electromotive force induced in coil 13 when connected, as in Fig. 2, is one-half of that induced voltage. Consequently the ratio of the voltage across the input circuit of the attenuator, when the connections are as shown in Fig. 1, to the voltage across the input to the attenuator when the connections are as shown in Fig. 2, is equal to twice the voltage amplification of the loop. This ratio is obtained as the ratio of the attenuation readings at the settings required to give the same deflections in $A_2$ in the two cases.

In Fig. 1 the attenuator is connected in circuit ahead of tube 21, and therefore a relatively large comparison voltage can be induced in winding 13 without overloading tube 21. Where this voltage is sufficient to permit it to be readily measured directly, as for example by connecting an ordinary vacuum tube voltmeter directly across coil 13, radio field strengths may be measured without ascertaining the voltage amplification due to loop resonance, without changing the circuit connections to that shown in Fig. 2. For, the voltage induced in the loop by the signals may be measured by noting the deflection of $A_2$ for incoming signals, with the attenuator adjusted to a reading $a$ so as to produce a deflection of convenient magnitude, inducing a comparison voltage in coil 13 from the comparison oscillator and setting the attenuator to a reading $b$ to give the same reading in $A_2$ as before, and, with the beating oscillator supplying no oscillations, measuring the comparison voltage across coil 13 directly with an ordinary vacuum tube voltmeter. Then, if the current impedance drop in the coil 13 due to current flowing in the coil during this latter measurement of voltage be neglected, the voltage induced in the loop by the signal is to this directly measured voltage as the attenuation $a$ is to the attenuation $b$. As before, the field strength is obtained by dividing this induced voltage by the effective height of the loop.

In the circuits of Figs. 1 and 2, the balancing of the loop with respect to the beating oscillator avoids error due to resonance effects in the circuit connecting the beating oscillator with the detector. The loop resonance frequency differs from the beating oscillator frequency only by the value of the intermediate frequency. For short waves, this difference is substantially negligible. However, if the loop were included in series in the circuit connecting the beating oscillator with the detector, it would be substantially anti-resonant to the oscillation frequency and any slight change in the tuning of the loop would cause a radical change in the character of the load on the beating oscillator, whereas by using the balanced connection the load on the beating oscillator is rendered independent of loop tuning. Changing the connections from those of Fig. 1 to those of Fig. 2 gives the loop step up fairly accurately.

The location of the attenuator 20 ahead of the detector 21 tends to avoid overloading the detector.

The feature of locating the attenuator to operate at the intermediate frequency is the invention of Harald T. Friis and is claimed in the Friis application referred to above.

What is claimed is:

1. In a measuring system, apparatus comprising a signal wave receiving antenna, a local comparison oscillator, a heterodyne wave source for supplying a wave for combining with a signal wave received by said antenna to produce a lower frequency wave, a circuit for receiving waves from said antenna and including a wave amplitude indicator, a detector included in said circuit for detecting said lower frequency wave, an anti-resonant circuit, means for connecting said anti-resonant circuit alternatively in series or in parallel with said local comparison oscillator and said antenna, and a calibrated wave attenuating device included in said circuit between said antenna and said indicator.

2. The method of measuring voltage amplification produced in a path due to resonance in the path, which comprises inducing in said path a voltage of the resonant frequency of the path in such manner as to cause the path to amplify said induced voltage, causing said amplified voltage to produce an indication which is a certain function of its amplitude, applying a voltage equal to said induced voltage to said resonant path as a parallel resonant path and causing a known portion of the voltage across said parallel resonant path to produce an indication which is a function of its amplitude bearing a known relation to said certain function, and controlling the amplitude of said indicated voltages in such manner as to render said indications equal, whereby the relative values of said voltages producing said equal indications are determined.

3. A system in accordance with claim 1, in which said antenna is a loop, said apparatus including a divided input coil adapted to connect said heterodyne source at the loop center to send waves simultaneously in opposite directions through the two halves of said loop, and said loop including means comprising a condenser adapted to balance said circuit with respect to waves from said heterodyne source to said loop.

4. A system in accordance with claim 1, said antenna being a closed loop, said apparatus comprising a divided input coil adapted to couple said heterodyne source to the loop center to send waves simultaneously in opposite directions through the two halves of the loop, said loop including means comprising a condenser adapted to balance said circuit with respect to said heterodyne source, and said attenuator consisting of a network of capacities.

5. A system in accordance with claim 1, in which said antenna is a coiled conductor connected to a tuning condenser, said apparatus including a divided input coil connecting said heterodyne source at the center of said coil to send waves simultaneously in opposite directions through the two halves of the coil, said coil including means comprising a condenser adapted to provide balanced paths for waves supplied from said heterodyne source to said coil, said attenuator consisting of a network of capacities, and said apparatus including a local comparison source of waves of the signal wave frequency connected across said tuning condenser.

6. In a measuring system, the combination comprising a signal wave receiving antenna, a local comparison source for supplying to said antenna waves of the signal frequency, a circuit for receiving waves from said antenna including means for reducing the frequency of waves received from said antenna, said circuit also including a wave attenuating device, a wave amplitude indicator and means for applying attenuated waves of reduced frequency to said indicator.

7. The combination in accordance with claim 6 in which said attenuating device included in said circuit for receiving waves from said antenna precedes said means for reducing the frequency of waves received from said antenna.

8. In combination with the measuring system of claim 6, means for applying the waves from said local comparison source directly to said circuit for receiving waves from said antenna.

In witness whereof, I hereunto subscribe my name this 24 day of April, A. D. 1926.

EDMOND BRUCE.